May 8, 1962  R. A. PROUD  3,032,825
METHOD OF SHAPING MATERIALS WITH ELASTIC MEMORY
Filed Dec. 23, 1960

INVENTOR.
Ralph A. Proud
BY
ATTORNEYS

United States Patent Office 3,032,825
Patented May 8, 1962

3,032,825
METHOD OF SHAPING MATERIALS WITH ELASTIC MEMORY
Ralph A. Proud, Willoughby Hills, Wickliffe, Ohio, assignor to Thompson Ramo Wooldridge Inc., Cleveland, Ohio, a corporation of Ohio
Filed Dec. 23, 1960, Ser. No. 78,169
7 Claims. (Cl. 18—56)

The present invention is directed to an improved method for shaping materials having the characteristic of elastic memory, that is, the property of reverting to a previous shape after being pressed in a cold die or the like.

The invention has particular applicability to the manufacture of shaft seals composed of polytetrafluoroethylene ("Teflon"). Heretofore, such seals were made by shaping a flat annular blank with a punch or the like into the configuration desired in the finished seal ring. In many instances, however, the use of the flat blank did not result in the production of a suitable product. The use of the annular flat blank made it necessary to achieve substantial flow of the material of the blank during the shaping operation, with the result that working strains were left in the material after its removal from the shaping assembly. Eventually, these strains brought about a tendency for the material to revert back into the original flat annular form. The seal thereupon shrank and frequently exhibited wrinkling at the outer diameter of the seal and leakage at the inner diameter. In addition, methods of shaping employed in the past have resulted in unequal distribution of material throughout the body of the seal, with the result that the seal was thinner in those portions which required greater mechanical rigidity.

This application is a continuation-in-part of my copending application entitled "Method of Shaping Materials With Elastic Memory," Serial No. 713,261, filed February 4, 1958, and now abandoned.

An object of the present invention is to provide an improved method for shaping seals and the like from materials having elastic memory.

Another object of the invention is to provide a method for shaping blanks of polytetrafluoroethylene in order to achieve a more uniform distribution of material and to minimize distortion of the material.

Still another object of this invention is to provide a method for making preform blanks of polytetrafluoroethylene for use in the forming of annular seals.

Another and specific object of this invention is to make an annular seal preform of generally U-shaped cross-section from a thin bendable hollow frusto conical blank of polytetrafluoroethylene in sintered semi-crystalline form.

One of the basic features of the present invention is the use of a frusto-conical hollow blank as the starting material for the shaping process. With this type of blank, the shaping operation results in the production of a seal in which distortion of the material is minimized and the portions of the seal which must have the greatest mechanical rigidity are provided with an adequate thickness of material.

A further description of the present invention will be made in conjunction with the attached sheet of drawings which illustrates a particular sequence of operations used in the formation of a seal of a particular configuration, but it will be evident that the techniques herein involved are equally applicable to seals and other structures of different configuration than that shown.

Figure 1:
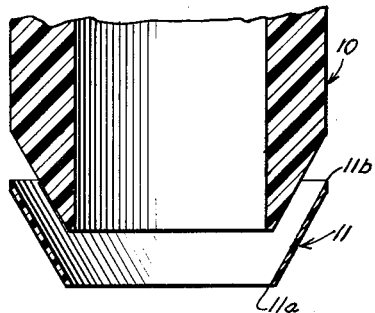
FIGURE 1 is a fragmentary view in cross-section illustrating the manner in which a hollow frusto-conical blank is skived from a tube of material.

In FIG. 1, reference numeral 10 indicates generally a tube of material having the property of elastic memory, such as polytetrafluoroethylene. This type of resin exists in a semi-crystalline form below temperatures of about 620° F. Above about 620° F., the material becomes a gel.

In the the manufacture of the tube 10, the polytetrafluoroethylene powder is compacted into the shape of the tube, and heated above the gel temperature, normally to a temperature of about 730° F. The tube is held at this temperature until complete transformation of the material into its gel form occurs. The time involved may be several hours.

After cooling, the thus sintered tube of semicrystalline structure is skived with a suitable knife or the like to cut-off a thin hollow frusto-conical blank generally indicated at numeral 11 in the drawings. Because this type of blank has a greater area of material between the inner and outer diameters than does a flat annular blank, the inner diameter 11a and the outer diameter 11b of the blank can be made substantially the same as the inner and outer diameters required in the finished seal. In normal practice, I prefer to employ a blank 11 which has an inner diameter and an outer diameter only slightly smaller than the corresponding dimensions in the finished article.

In the manufacture of seals, the blank 11 may have a thickness usually ranging from about 0.0125 inch to 0.0175 inch. This blank is then positioned within the central form of a male die 12, the latter having an axial bore 12a and shaping surfaces including a relatively straight inner edge 12b, a relatively flat land portion or rib 12c and an outer marginal groove 12d for shaping the outer peripheral flange of the seal member. One of the further advantages arising from the use of the hollow frusto-conical shaped blank 11 is the fact that it will seat itself properly within the shaping cavity automatically, whereas with a flat annular type of blank, proper positioning of the blank within the shaping assembly was frequently a problem.

Figure 2:
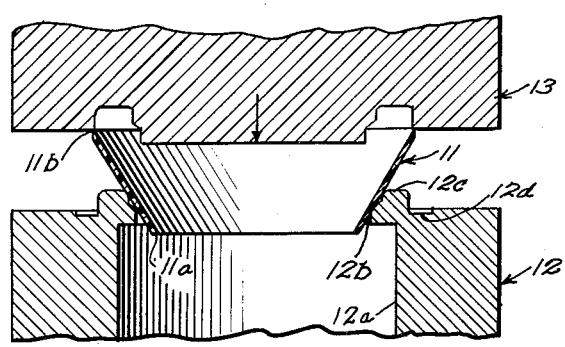
FIGURE 2 is a cross-sectional view illustrating the manner in which the frusto-conical blank is received within the form of a male die and is initially engaged by a female die.
Figure 3:
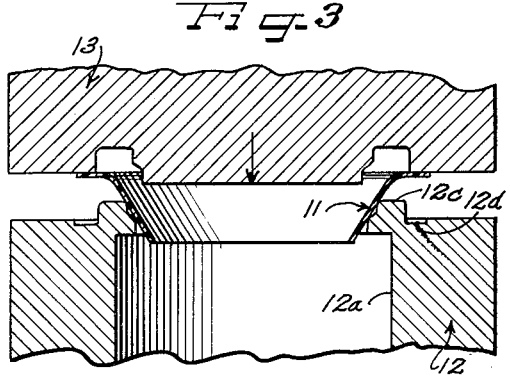
FIGURE 3 is a cross-sectional view, similar to FIG. 2 but illustrating the position of the die parts at the start of the bending or blank deforming operation.
Figure 4:
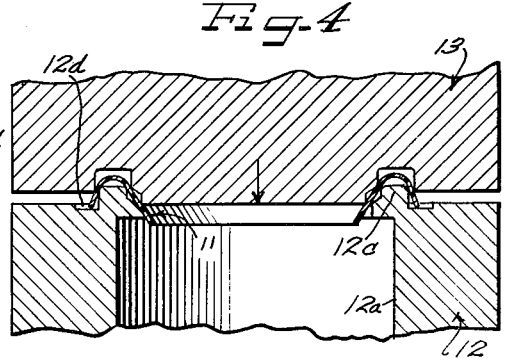
FIGURE 4 is a cross-sectional view similar to FIG. 3 but illustrating the die parts in the position where the outer peripheral portion of the hollow frusto-conical blank is curled over the rib of the male die.

As shown in FIG. 2, the upper or larger diameter end of the hollow frusto-conical blank 11 projects beyond the top of the hollow male die 12 and is initially engaged by the underface of a female die 13. As the dies are moved relatively to close the space therebetween, the upper end portion of the blank 11 is deformed outwardly to form a flattened and flared out end portion. Then as the dies are moved further toward each other, as shown in FIG. 4, the flared out flattened portion of the blank curls or snap forms over the rib 12c of the male die 12 to provide a generally U-shaped configuration to the blank. As shown in FIG. 4, the dies 12 and 13 are still in a partially opened position and the blank does not conform fully with the cavity defining portions of the dies.

The preforming operations are carried out at temperatures substantially below the gel forming temperature of polytetrafluoroethylene. Room temperatures can be used.

Figure 5:
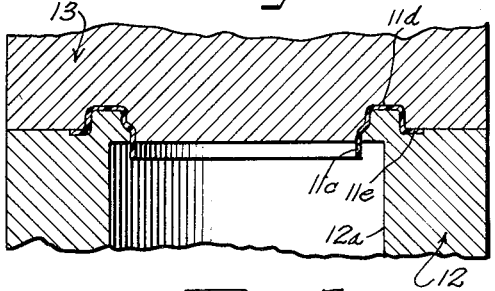
FIGURE 5 is a view similar to FIG. 4 but illustrating the dies in closed position.

When the dies are closed as shown in FIG. 5, the blank in the shape shown in FIG. 4 is deformed into the shape of the die cavity.

Figure 6:
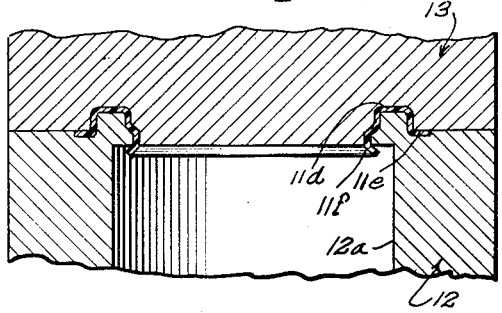
FIGURE 6 is a view similar to FIG. 5 but illustrating the condition existing after the inner peripheral edge of the blank is peened over slightly prior to final shaping.
Figure 7:
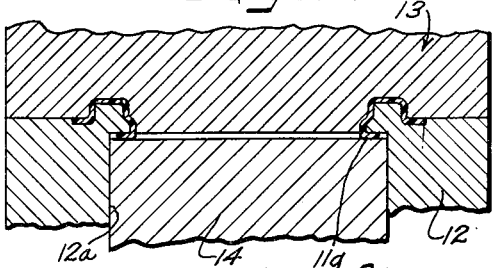
FIGURE 7 is a fragmentary cross-sectional view with parts in elevation illustrating the final punching operation which turns in the previously peened-over edge of the blank.

During the shaping of the blank from the curled over position of FIG. 4 into the shaped condition of FIG. 5 an inner cylindrical edge portion 11c is provided together with a relatively flat central portion 11d, and an outer peripheral flange portion 11e. Part of the cylindrical portion 11c projects beyond the female die member 13 into the hollow interior of the male die member 12 and this portion is partially peened over to form an outwardly turned inner marginal edge portion 11f as shown in FIG. 6. The peening can be accomplished through the use of a punch or other suitable tool.

Finally, the outwardly extending edge portion 11f is formed into a relatively flat flange portion 11g by inserting a solid cylindrical punch 14 within the bore 12a and pressing the punch 14 against the end portion 11f.

The shaping can be done at temperatures up to about 600° F. The formed seal in the die is then quenched in water.

The seal which results from the operation described has been found to overcome substantially all the difficulties which have been encountered in seals of this type previously. There is a better distribution of material throughout the body of the seal so that there are no excessive stress concentrations in any portion of the seal. Hence, the tendency for the seal to revert to its original shape is minimized and distortion of the seal as well as the leakage problems caused thereby are eliminated.

In referring to FIGS. 1 to 5, it will be noted that the frusto-conical blank 11 (FIG. 1) has a predetermined side height or cross-sectional length (extending at an angle to the vertical from the inner diameter 11a to the outer diameter 11b) which is substantially equal to the cross-sectional length of the formed piece in the mold in FIG. 5, extending from the inner cylindrical portion 11c to the outer extremity at the flange 11e, which cross-sectional length may be referred to as the final peripheral dimension of the said formed blank in cross-section. In this way, the forming operation demonstrated in FIGS. 1 to 5 is accomplished by what is essentially a bending operation, rather than an operation involving "moving" substantial masses of plastic so as to effect substantial alterations and variations in the cross-sectional thickness of the blank before and after forming.

It will be evident that various modifications can be made to the described embodiment without departing from the scope of the present invention.

I claim as my invention:

1. In the method of making an annular seal member from a plastic material having elastic memory, the steps which comprise providing a hollow thin readily bendable frusto-conical blank of said material having a substantially uniform thickness and a length in cross-section extending at an angle from the vertical from the inner to the outer diameter of the blank which is substantially equal to the final peripheral dimension of the finished seal member in cross-section extending from the inner to the outer diameter of the seal member, nesting said blank along the inner diameter end portion thereof in a rigid hollow die with the outer diameter portion thereof projecting beyond the die and surrounded by an annular rib of the die, applying force to the outer peripheral portion of the blank in a direction toward the rib, bending the portion of the blank extending beyond the die with said force to curl the extending portion around the rib and thereby forming a preform of generally U-shaped configuration.

2. The method of making an annular seal member from polytetrafluoroethylene which comprises providing a thin, readily bendable, hollow frusto-conical blank of polytetrafluoroethylene having a substantially uniform cross-sectional thickness, nesting said blank in a hollow die with the large diameter end portion of the blank projecting beyond the die, applying force to the large diameter projecting end portion of the blank to bend said projecting end portion into a flanged outer peripheral portion, pressing the thus bent blank between shaping dies to conform the blank to the die cavity shape and produce an annular seal shape with a final peripheral dimension in cross-section extending from the inner to the outer extremity thereof substantially equal to the side height of the initial frusto-conical blank, whereby the pressing of the initial blank involves essentially only a bending of the blank.

3. In the method of making an annular seal member from polytetrafluoroethylene the steps which comprise providing a hollow frusto-conical blank of sintered polytetrafluoroethylene having a uniform thickness not substantially in excess of 0.0175 inch, nesting said blank in a hollow die with the large diameter end portion of the blank projecting beyond the die, applying force to the large diameter outer end portion of the blank to form said portion into a generally U-shaped configuration, and pressing the resulting U-shaped blank into conformity with the hollow die to provide a preform from which a finished annular seal member can be easily made.

4. The method of making an annular seal member preform from a plastic material having elastic memory which comprises skiving from a sintered tube of said plastic material a hollow thin readily bendable annulus blank having a base periphery, a converging side wall and an apex periphery smaller than the base periphery, nesting said blank along the apex periphery end thereof in a rigid hollow die with the base periphery end portion of the blank projecting beyond the die and surrounded by an annular rib of the die, applying force to the base periphery portion of the blank in a direction toward said annular rib of the die, deforming with said force the portion of said blank beyond the die over said annular rib of the die and thereby providing a U-shaped preform from which a seal can easily be made.

5. The method of making a preform for an annular polytetrafluoroethylene seal member which comprises providing a hollow thin readily bendable frustoconical blank of sintered polytetrafluoroethylene having a substantially uniform thickness and a side height extending at an angle from the vertical from the inner to the outer diameter of the blank substantially equal to the final peripheral dimension of the finished seal member in cross-section extending from the inner to the outer diameter of the seal member, nesting said blank along the inner diameter portion thereof in a rigid hollow die with the outer diameter portion of the blank projecting beyond the die and surrounded by an annular rib of the die, and applying force to the outer peripheral portion of the blank to bend the portion of the blank extending beyond the die into conformity with said rib and thereby provide a substantially U-shaped preform.

6. The method of making an annular seal member from polytetrafluoroethylene which comprises providing a hollow frusto-conical blank of polytetrafluoroethylene having a uniform thickness not substantially in excess of 0.0175 inch, nesting said blank in a hollow die, applying pressure to the outer peripheral extremity of said blank to form said extremity into a flanged outer edge portion, and applying pressure to the inner extremity to bend said extremity sufficiently to form a generally cylindrical portion, and applying pressure to the intermediate portion of said blank to bend the same into a generally U-shaped cross-section, the final peripheral dimension of said formed blank in cross-section extending from the inner to the outer extremity thereof being substantially equal to the side height of the initial frusto-conical blank, whereby the pressing of the initial blank involves essentially only a bending of the blank, said pressures being applied while said blank is at a temperature not in excess of 600° F.

7. The method of making an annular seal member from polytetrafluoroethylene which comprises providing a thin, readily bendable, hollow frusto-conical blank of polytetrafluoroethylene having a substantially uniform cross sectional thickness, nesting said blank in a hollow die, applying pressure to the outer peripheral extremity of said blank to form said extremity into a flanged outer edge portion, and applying pressure to the inner extremity to bend said extremity sufficiently to form a generally cylindrical portion, and applying pressure to the intermediate portion of said blank to bend the same into a generally U-shaped cross-section, the final peripheral dimension of said formed blank in cross-section extending from the inner to the outer extremity thereof being substantially equal to the side height of the initial frusto-conical blank, whereby the pressing of the initial blank involves essentially only a bending of the blank, said pressures being applied while said blank is at a temperature not in excess of 600° F.

References Cited in the file of this patent

UNITED STATES PATENTS

| | | |
|---|---|---|
| 2,456,262 | Fields | Dec. 14, 1948 |
| 2,781,552 | Gray | Feb. 19, 1957 |

OTHER REFERENCES

"Teflon" Molding Techniques, Du Pont Information Bulletin No. X-7c, July 17, 1959, 11 pages.

"Teflon"—Properties—Uses, published by Polychemicals Dept. of E. I. du Pont de Nemours & Co. (Inc.), Wilmington, Del., August 1957, 32 pages.